United States Patent
Pan (10) Patent No.: US 6,883,646 B2
(45) Date of Patent: Apr. 26, 2005

(54) OIL INJECTION APPARATUS

(75) Inventor: Robert Pan, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 195 days.

(21) Appl. No.: 10/234,327

(22) Filed: Sep. 5, 2002

(65) Prior Publication Data

US 2003/0221912 A1 Dec. 4, 2003

(30) Foreign Application Priority Data

May 31, 2002 (TW) ..................................... 91208076 U (51) Int. Cl.$^7$ ............................................. F16N 29/02
(52) U.S. Cl. ................................. 184/6.12; 184/105.1
(58) Field of Search ................................ 184/5.1, 6.12, 184/6.18, 105.1, 109

(56) References Cited

U.S. PATENT DOCUMENTS 5,020,635 A * 6/1991 Lunn ......................... 184/6.18

* cited by examiner

*Primary Examiner*—Chong H. Kim
(74) *Attorney, Agent, or Firm*—Birch Stewart Kolasch & Birch, LLP (57) ABSTRACT

An oil injection apparatus for injecting lubricating oil to gears, bushings and the like includes an oil injection dock, which has a housing section for holding a plurality of objects for oil injection, and an oil injection section corresponding to the housing section. The oil injection section has a plurality of oil injection outlets and a sensor. When the object for oil injection drops into the oil injection section, the sensor transmits a signal to an oil supply device to inject lubricating oil through the oil injection outlets to the object.

8 Claims, 11 Drawing Sheets

OIL INJECTION APPARATUS

FIELD OF THE INVENTION

The invention relates to an oil injection apparatus for injecting lubricating oil to gears, bushings and the like, and particularly to an oil injection apparatus that has an oil injection dock with a sensor located thereon to detect objects for oil injection and transmit oil injection signals to an oil injection device to automatically supply oil to the gears and bushings during assembly.

BACKGROUND OF THE INVENTION

Gears have played an important role ever since machinery has been used. They greatly improve the operating efficiency of machines whether in kinetic or mechanical linkage applications. Manufacturing industries at present have a great demand for automation. In production machinery, gears are widely used in various types of linkage mechanisms. With constant improvements and developments, gears have also evolved into many different types and specifications, and can perform various functions. For instance, in addition to the simplest spur gears, there are precise gears, helical gears, bolt troughs and T shafts, worms and worm gears, ratchets and standard gears. Nowadays gears are almost ubiquitously employed in everything in people's daily life, such as machines and instruments in industries, and transportation facilities. Printers or multifunctional office machines have multiple power driving devices, which generally consist of a plurality of gears. To ensure that the gear sets function properly and smoothly, each gear set must be injected with lubricating oil before assembly.

Gear lubrication is the most commonly adopted maintenance method. Lubrication enables gears to maintain optimal operating conditions. Commonly adopted gear lubrication methods include grease lubrication, submerged lubrication; force-feed lubrication (circulating feeding oil), etc. The method to be adopted mainly depends on gear utilization. Selection criteria are gear perimeters and rotation speed. Low speed gears generally adopt grease lubrication; intermediate speed gears adopt submerged lubrication, and high-speed gears adept force-feed lubrication. Among these methods, grease lubrication is the most commonly used. It is performed before the gears are assembled, and is done manually by dispensing lubricating oil with grease guns on the gear axle holes or gear grooves to form a layer of oil on the gear surfaces. The purpose is to make the gears slide easily between them, reduce the coefficient of friction between the gear surfaces, control rising temperature resulting from friction between the gears, and provide cooling for the gear surfaces.

However, to inject oil manually involves complicated operations. Operators have to constantly disassemble the gears, inject oil into the axle holes, assemble the gears again, and inject oil into the gear grooves. These tasks are tedious and time-consuming, which reduces efficiency. Moreover, during oil injection operations, operators often directly press the oil outlet of the grease gun on the gear grooves or axle holes to save time, causing the oil outlet to become larger after repeated operations. As a result, oil dispensing becomes difficult to control and easily results in waste. In addition, after the assembly and oil injection operations are repeatedly performed, operation processes are prone error, resulting in lower assembly quality.

SUMMARY OF THE INVENTION

The primary object of the invention is to provide an oil injection apparatus to simplify oil injection processes for gears or bushings to prevent the waste of labor in manual oil injection operations and make oil injection more precise.

The oil injection apparatus of the invention includes an oil injection dock with a housing section to hold a plurality of objects for oil injection, and an oil injection section corresponding to the housing section. The oil injection section has a plurality of oil injection outlets and a sensor. When the objects for oil injection are dropped to the oil injection section, the sensor transmits a signal to an oil injection device to supply oil through the oil injection outlets to the objects for oil injection.

The housing section is a chuck for holding the objects and may be coupled with the oil injection dock. The housing section also has a rod. The sensor may detect the objects for oil injection and transmit oil injection signals to the oil injection device, and may be adopted for assembly operations to automatically inject oil on the gears or bushings. Oil injection may be controlled to a required constant amount and loss of oil may be minimized.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 10-1 is a schematic view of the invention in an operating condition.

FIG. 10-2 is a schematic view of the invention in another operating condition.

FIG. 10-3 is a schematic view of the invention in yet another operating condition.

FIG. 10-4 is a schematic view of the invention in still another operating condition.

DESCRIPTION OF THE PREFERRED EMBODIMENTS

Figure 1:
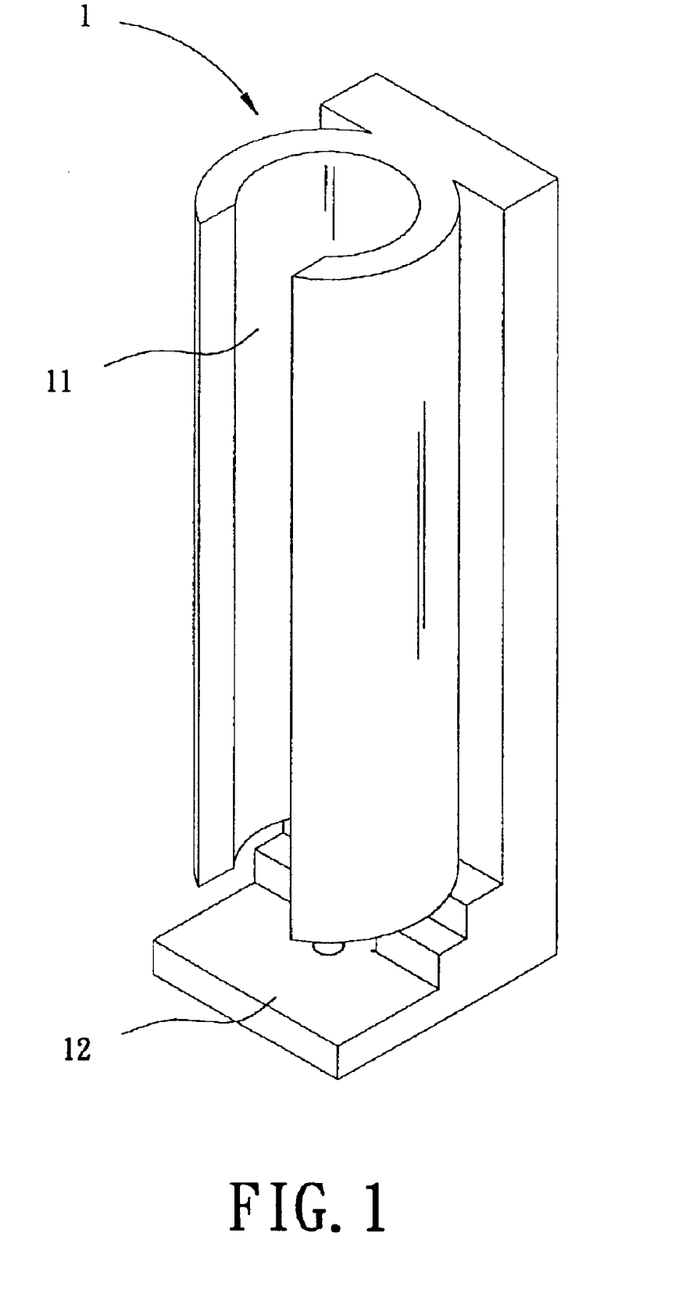
FIG. 1 is a perspective view of the invention.
Figure 2:
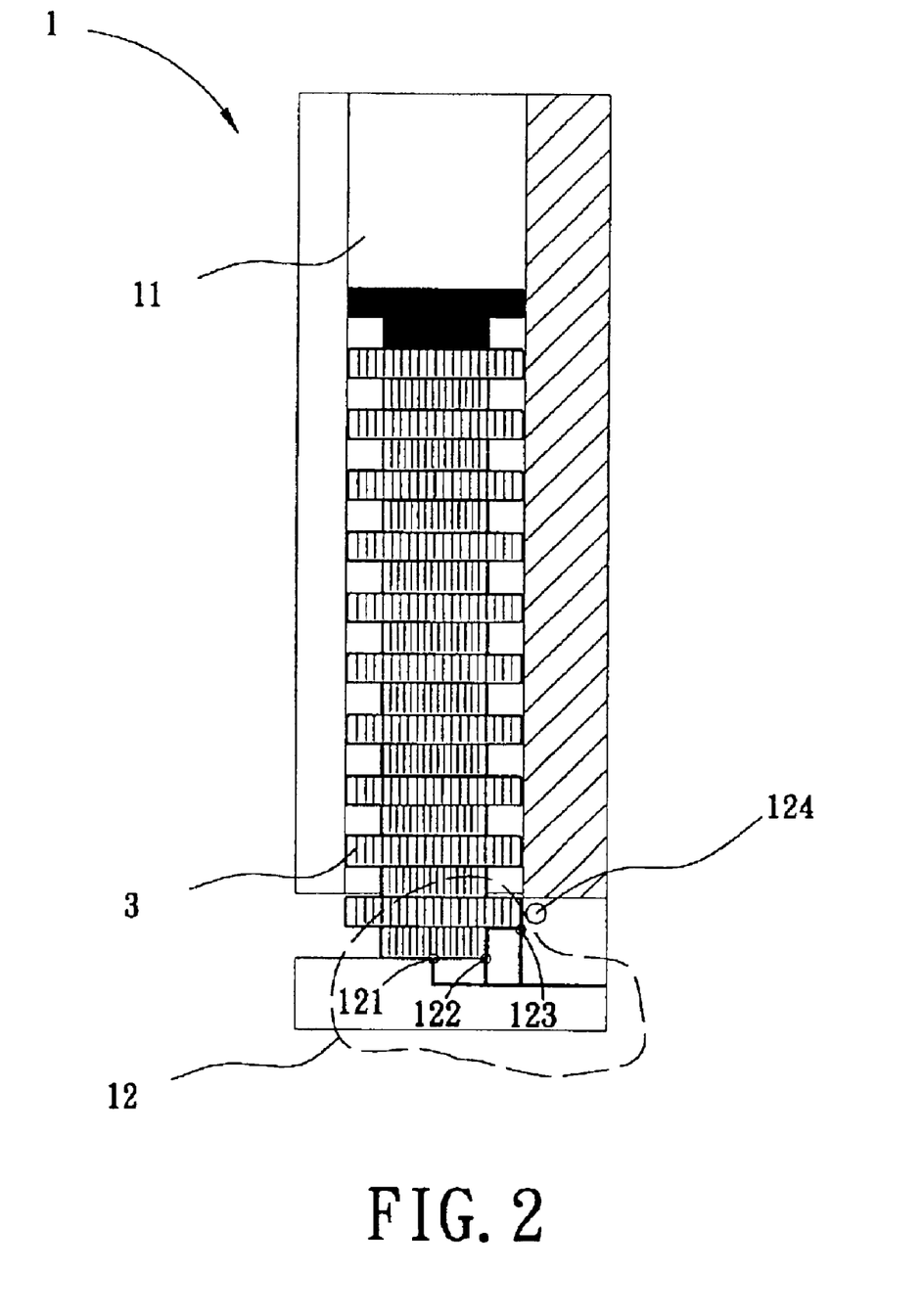
FIG. 2 is a cross section of the invention, holding objects for oil injection.

Referring to FIGS. 1 and 2, the oil injection apparatus of the invention aims at injecting lubricating oil to gears, bushings or the like. The apparatus includes an oil injection dock 1, which has a housing section 11 for holding a plurality of objects for oil injection and an oil injection section 12 corresponding to the housing section. The oil injection section 12 has a plurality of oil injection outlets (such as an axle hole oil injection outlet 121, a first gear groove oil injection outlet 122 and a second gear groove oil injection outlet 123) and a sensor 124. When the object for oil injection (gear 3) drops onto the oil injection section 12, the sensor 124 transmits a signal to an oil supply device to supply lubricating oil through the oil injection outlets (121, 122 and 123) to the object for oil injection.

Figure 3:
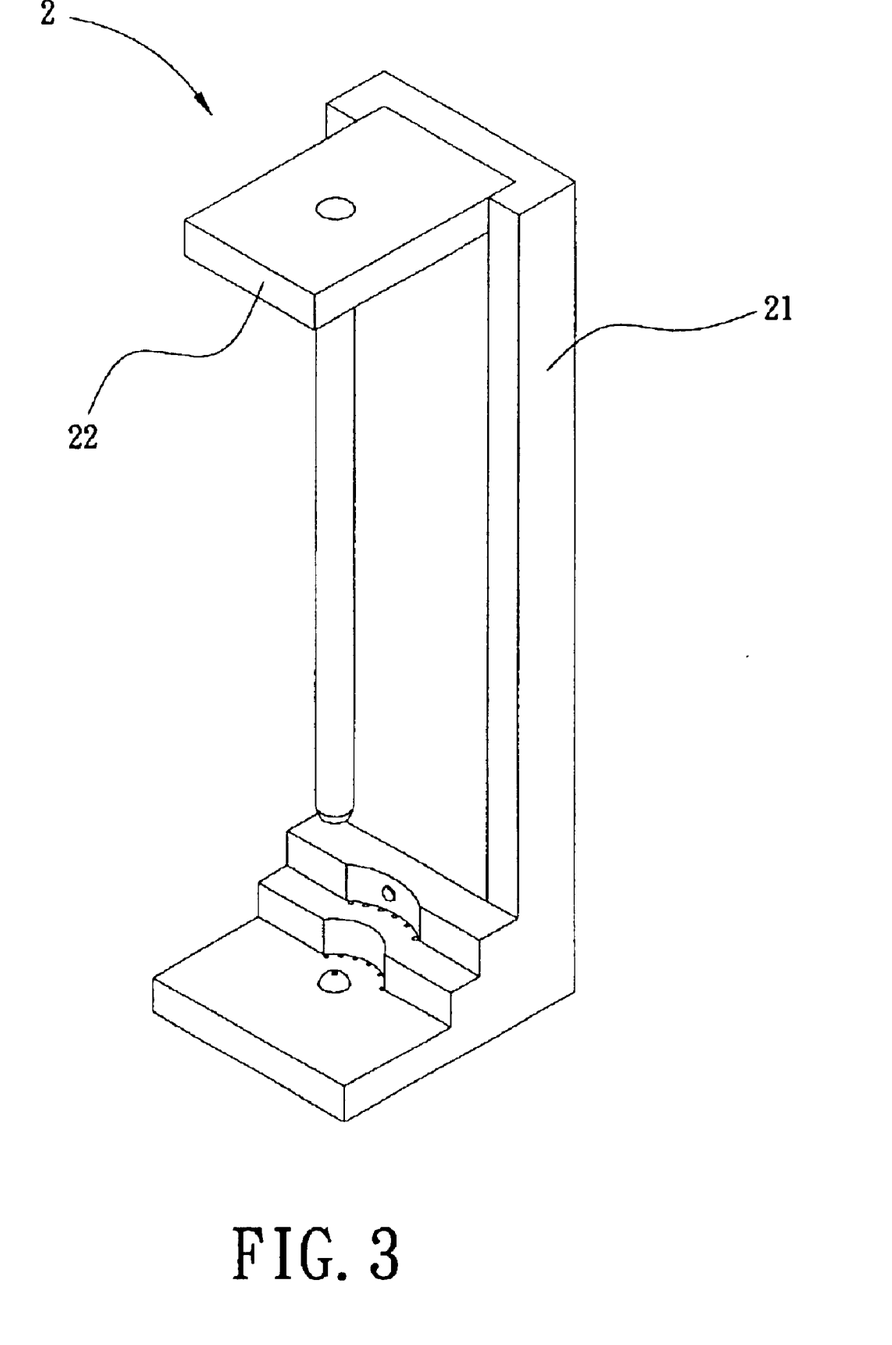
FIG. 3 is a perspective view of another embodiment of the invention.
Figure 4:
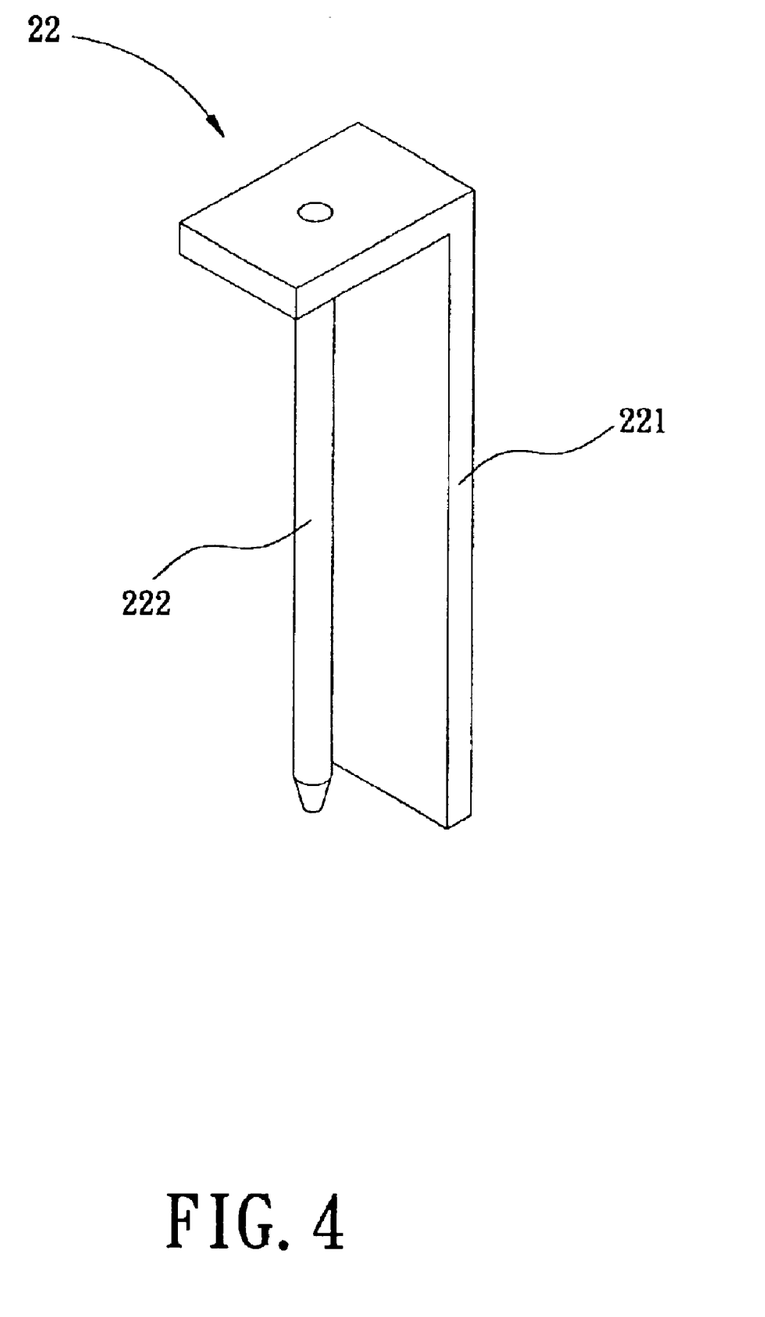
FIG. 4 is a fragmentary perspective view of another embodiment of the invention.
Figure 5:
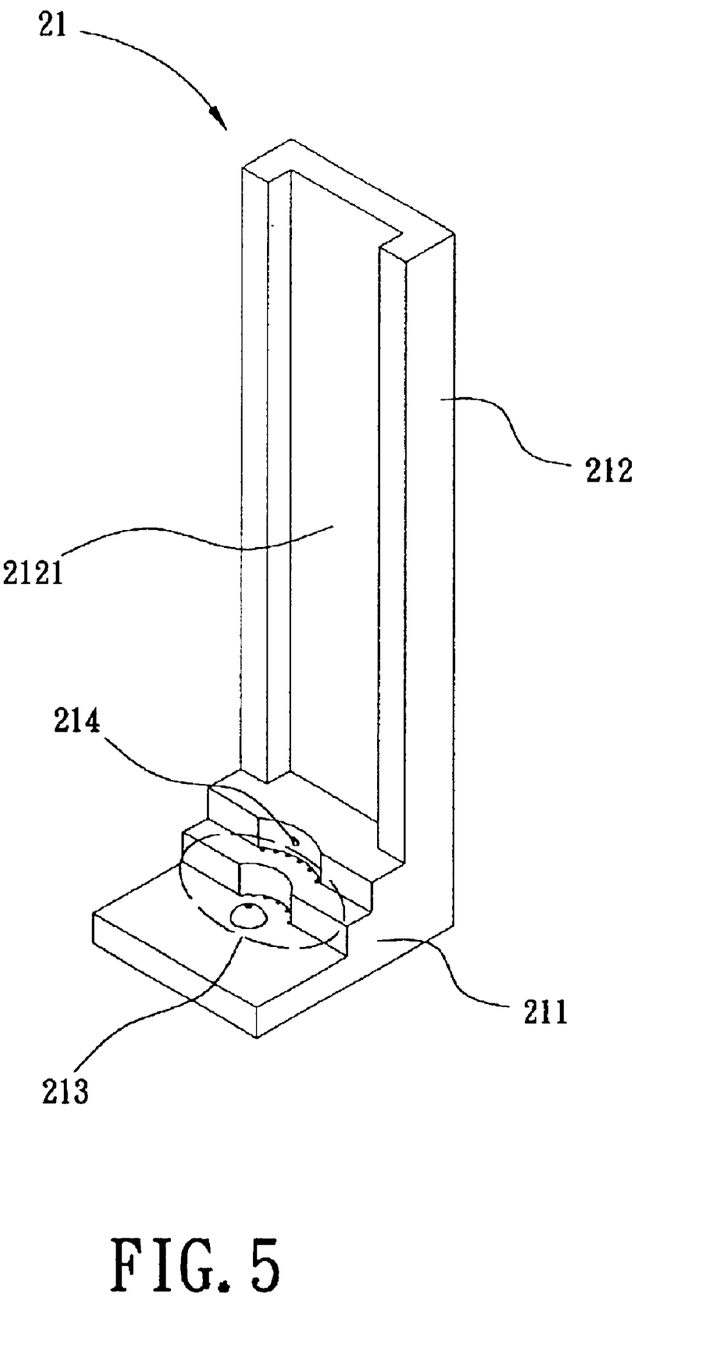
FIG. 5 is another fragmentary perspective view of another embodiment of the invention.
Figure 6:
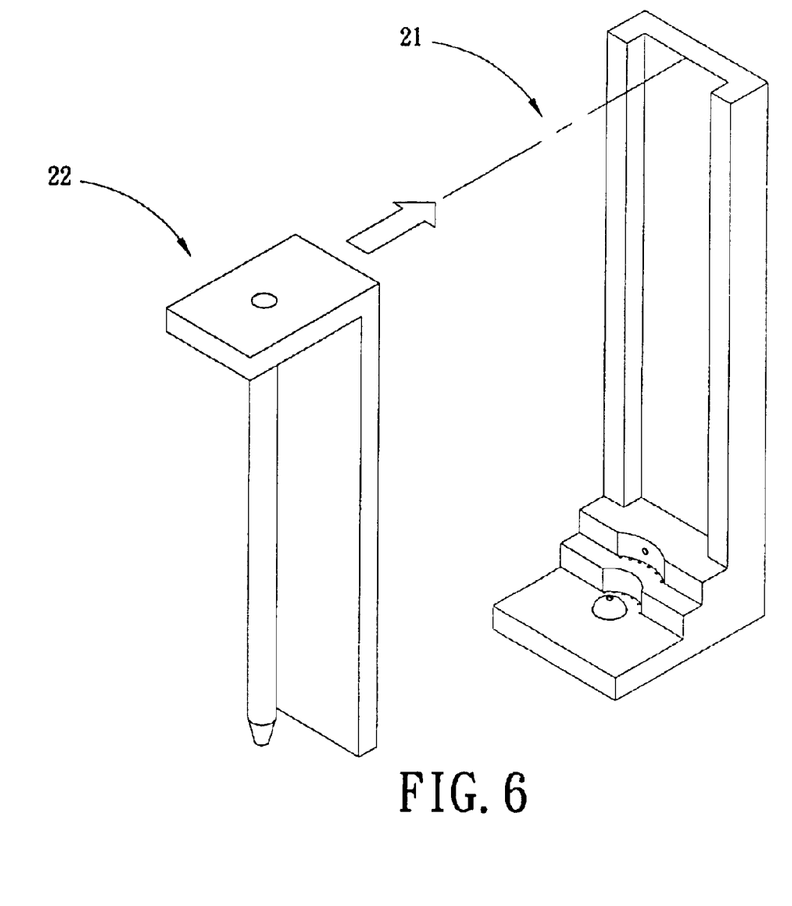
FIG. 6 is an exploded view of another embodiment of the invention.
Figure 7:
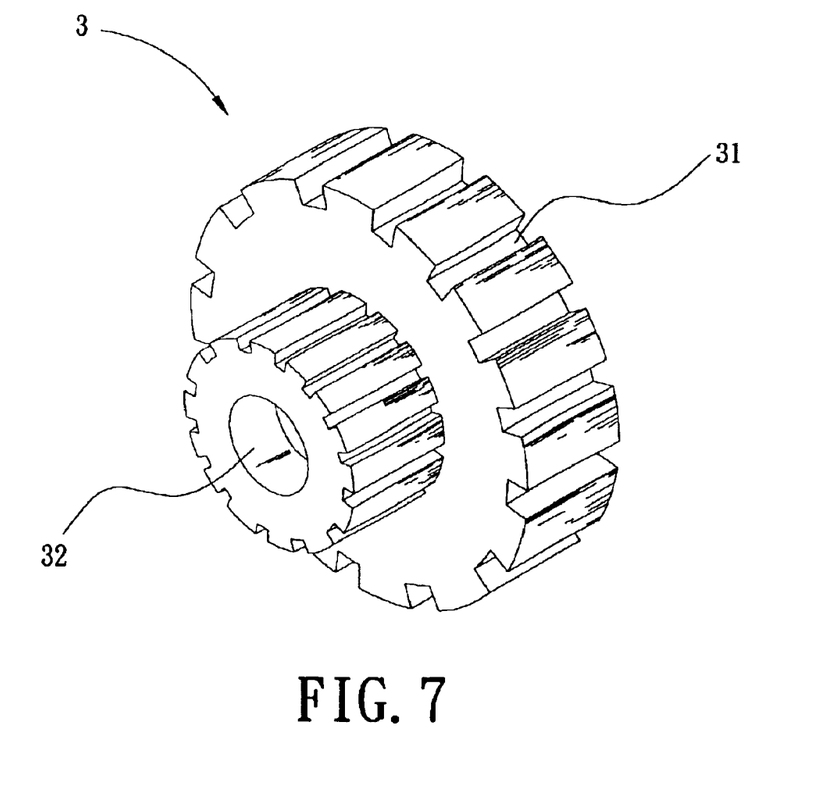
FIG. 7 is a perspective view of a conventional gear.
Figure 8:
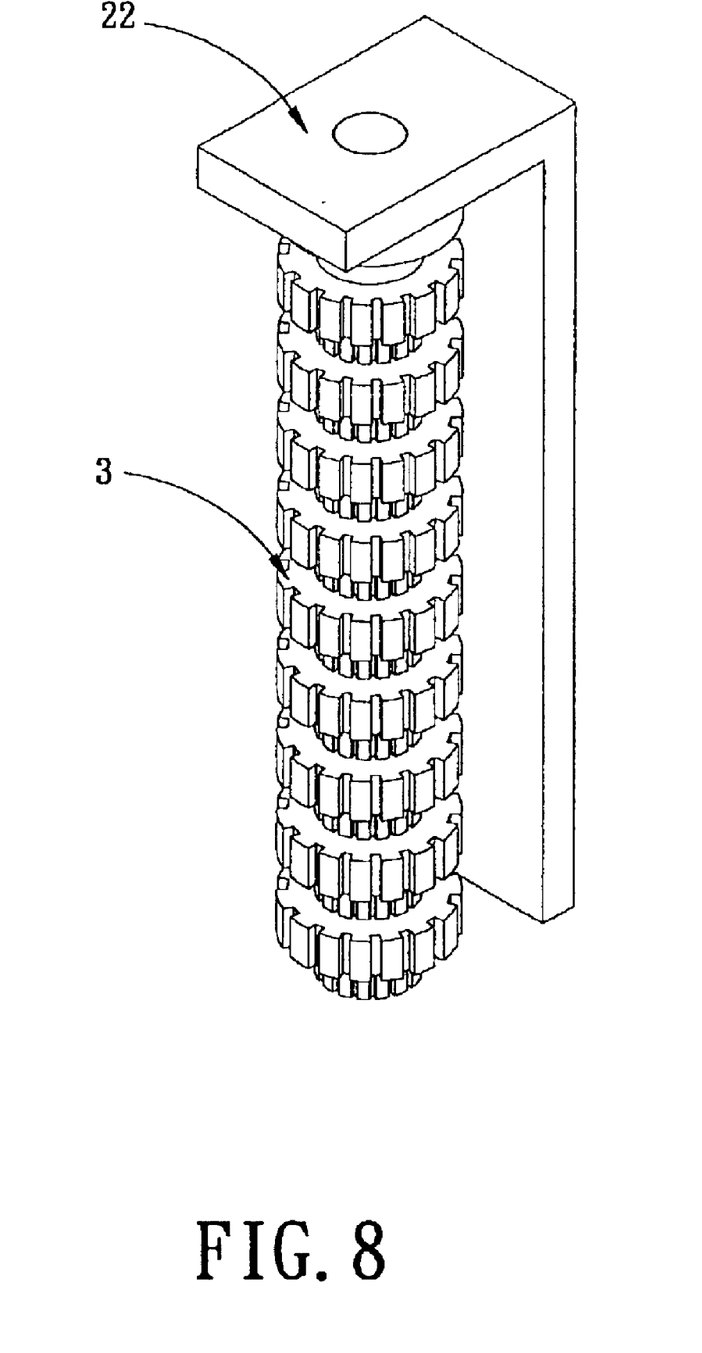
FIG. 8 is a fragmentary schematic view of the invention in use.

Refer to FIGS. 3, 4 and 5 for another embodiment of the invention. The oil injection apparatus 2 includes an oil injection dock 21 and an object chuck 22. The oil injection dock 21 has an oil injection section 213 embedded therein. There is a sensor 214 located above the oil injection section 213. The upper portion of the oil injection dock 21 has a vertical surface, which forms a clipping trough 212 to engage with the object chuck 22. The object chuck 22 includes a frame 221 and a rod 222. The rod 222 is extended from the upper portion to the lower portion. Referring to FIG. 6, during assembly, the frame 221 of the object chuck 22 is engaged with the clipping trough 212 of the oil injection dock 21. The oil injection section 213 is located on a base seat 211 of the oil injection dock 21. The oil injection section 213 has an oil passage embedded therein. The oil passage has an axle hole oil injection outlet 2131, a first gear groove oil injection outlet 2132 and a second gear groove oil injection outlet 2133. The axle hole oil injection outlet 2131 is an arched jutting element with the center of the outlet matching the center of the rod 222 located at the lower portion of the object chuck 22. The first gear groove oil injection outlet 2132 is located at a desired position around the axle hole oil injection outlet 2131, and the second gear groove oil injection outlet 2133 is located on a second layer around a perimeter centered at the axle hole oil injection outlet 2131. Refer to FIG. 7 for a conventional gear. The main lubrication portions of the gear 3 are the gear grooves 31 and the inner wall of the axle hole 32. Referring to FIG. 8, the gears 3 are packaged in a string and coupled in the object chuck 22. Once the object chuck 22 is wedged in the clipping trough 212 of the oil injecting dock 21, oil injection operations may begin.

Figure 9:
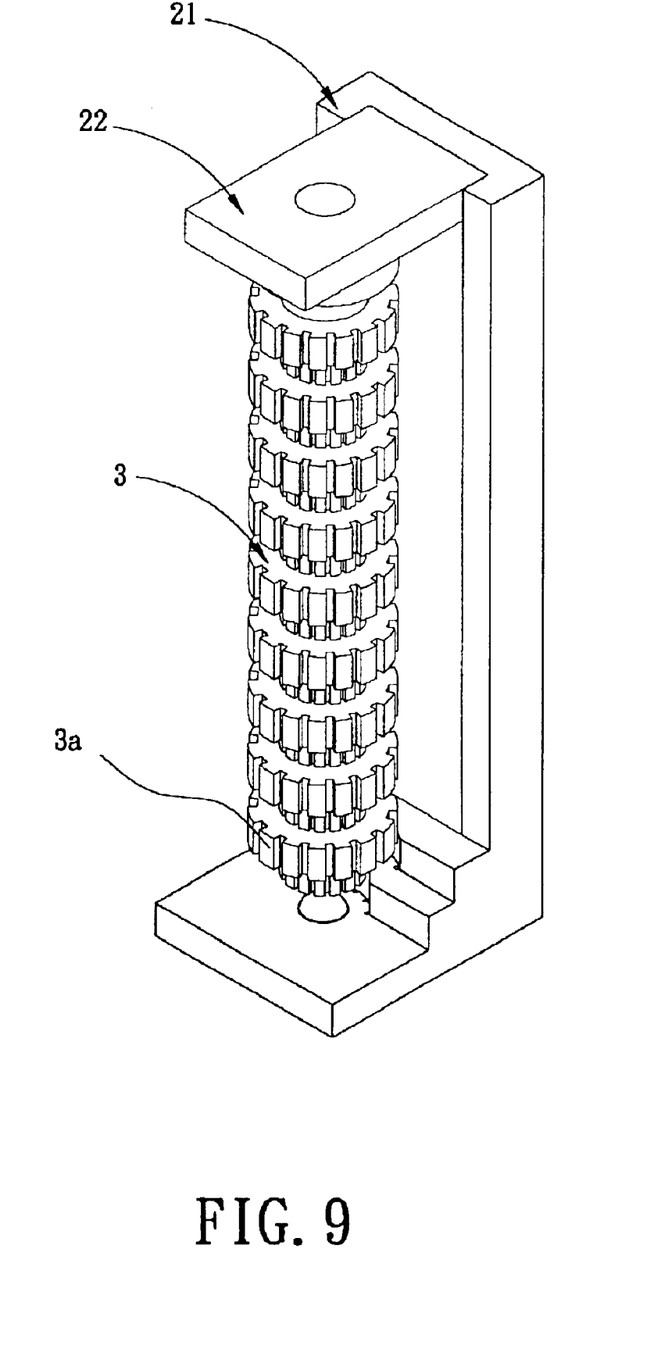
FIG. 9 is a schematic view of the invention in use.
Figure 10:
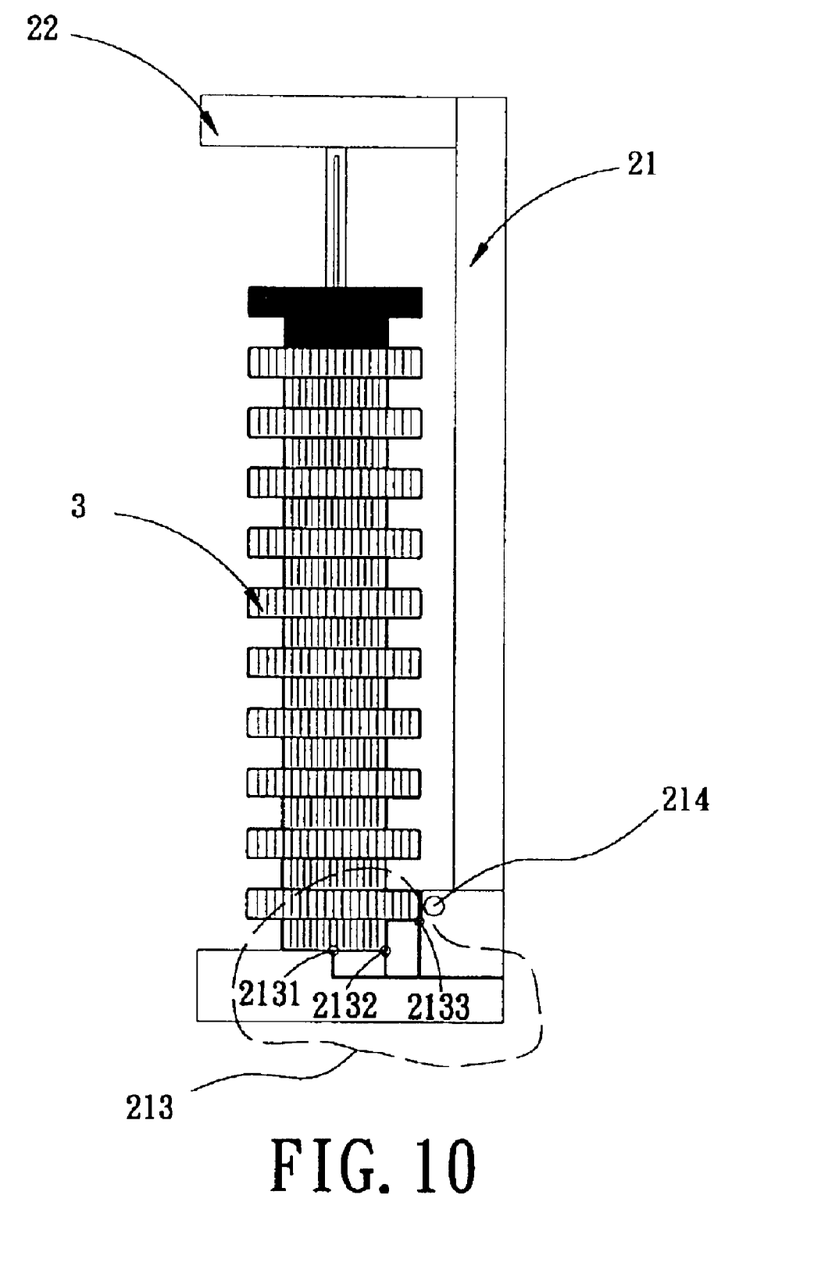
FIG. 10 is a schematic side view of the invention in use.
Figure 101:
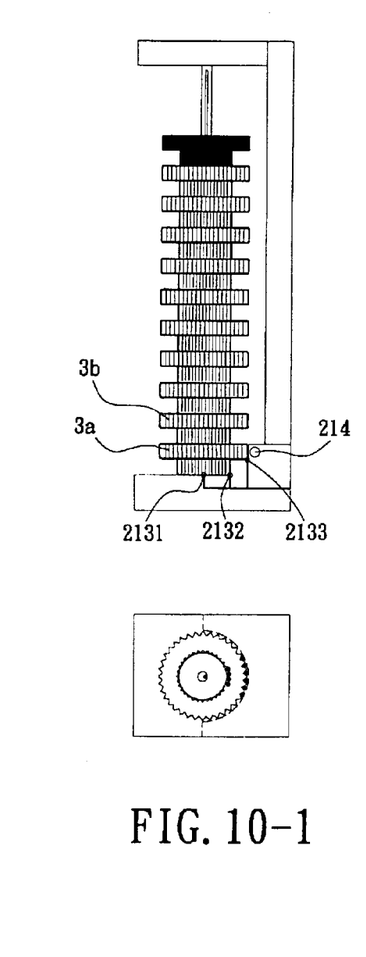
Figure 102:
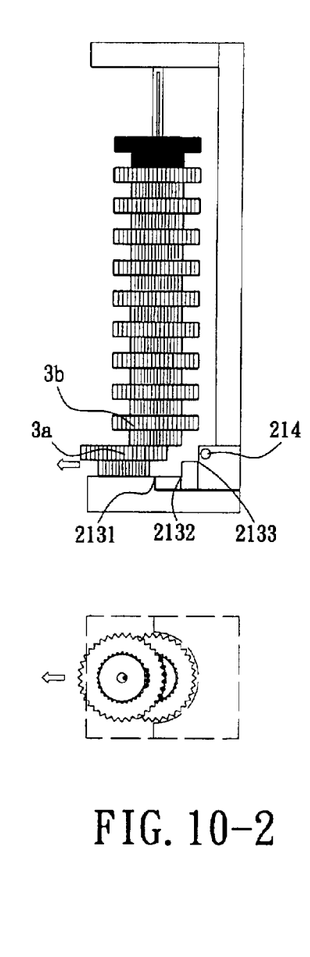
Figure 103:
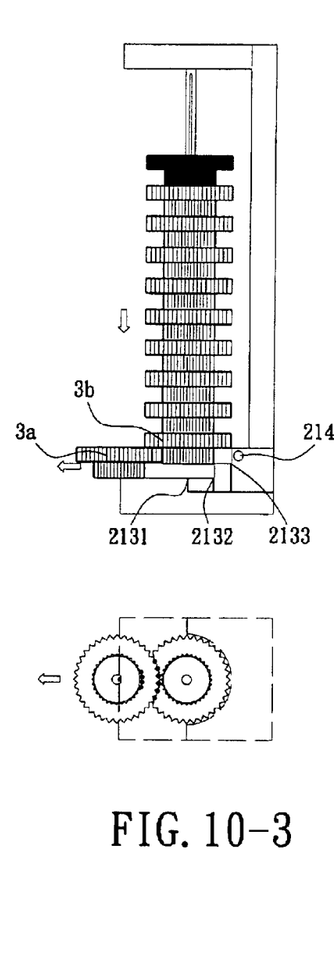
Figure 104:
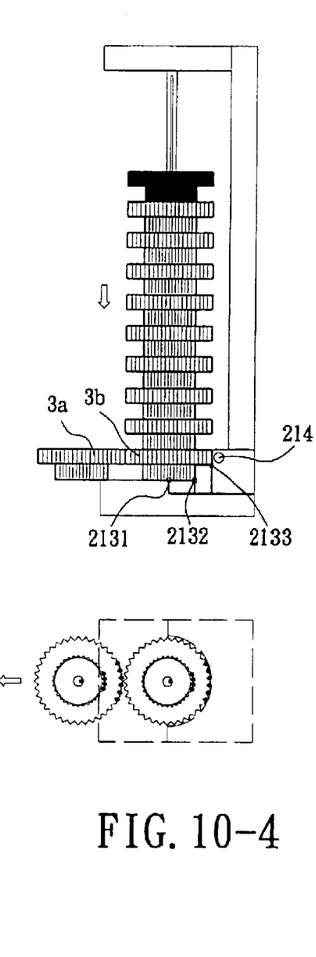

Referring to FIG. 9, after a string of gears 3 is coupled in the object chuck 22 and the object chuck 22 is wedged in the clipping trough 212 of the oil injection dock 21, the gears 3 drop downwards due to gravitational force. As shown in the drawing, the gear 3a drops and is located above the axle hole oil injection outlet 2131. The gear grooves of a smaller diameter are positioned above the first gear groove oil injection outlet 2132, and the gear grooves of a larger diameter are positioned above the second gear groove oil injection outlet 2133. After the gear 3a is positioned, the perimeter of the larger gear groove diameter blocks the signal of the sensor 214.

Refer to FIGS. 10-1 through 10-4 for various operating conditions of the invention:

1. Referring to FIG. 10-1, when the gear 3a is positioned, the signal of the sensor 214 is blocked. The oil injection section 213 is triggered to inject oil with a constant amount to various oil outlets. Oil is injected through the axle hole oil injection outlet 2131 into the axle hole 32 of the gear 3a, and injected through the first and the second gear groove oil injection outlets 2132 and 2133 onto the gear.
2. Referring to FIG. 10-2, when operators remove the gear 3a, the axle hole 32 scrapes oil in the axle hole oil injection outlet 2131, and the gear grooves also have lubricating oil adhered thereon.
3. Referring to FIG. 10-3, when the gear 3a is moved out slowly, the gear 3b above drops down sequentially.
4. Referring to FIG. 10-4, when the gear 3a is removed completely, the gear 3b drops down and is positioned. The sensor 214 is blocked again, and oil is injected through the oil injection outlets 2131, 2132, and 2133.

The oil injection operations set forth above may be repeated in cycles continuously.

In summary, the oil injection apparatus of the invention can achieve at least the following advantages:

1. Employing the invention, the gears may be packaged in a uniform manner (in strings). As a result, the total size can be reduced to ¼ of the original size. Packaging of the gears may be done faster, and removing the gears may be done in a constant direction.
2. The gear string is located on the automatic oil injection apparatus. When the gears are removed, the axle holes and gear grooves are injected with oil without manual labor to perform oil injection operations. Manual operations can be simplified to reduce labor costs.
3. The oil injection outlets of the oil passage have a smaller diameter. The oil injection path can be changed from a single path to multiple paths to inject oil concurrently. Oil can be dispensed evenly into multiple gear grooves so that the grease or oil can be prevented from splashing out during gear rotation to reduce waste.

Through the automatic oil injection apparatus of the invention set forth above, it is clear that oil injection for gears can be simplified. Waste of labor in manual oil injection operations can be avoided, and the amount of oil injection can be controlled precisely.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An oil injection apparatus, comprising:

an oil injection dock with an oil passage embedded therein and extended to a base seat of the oil injection dock and connected to oil injection outlets;

a sensor located above the oil injection dock, wherein the sensor detects whether objects for oil injection are positioned; and an object housing section located above the oil injection dock including a rod extended downwards from a desired location at an upper plane thereof to couple with a string of gears.

2. The oil injection apparatus of claim 1, wherein the housing section includes an object chuck which has a width engageable with a clipping trough formed on the oil injection dock.

3. The oil injection apparatus of claim 1, wherein the oil injection outlets are located on a vertical surface of the base seat.

4. The oil injection apparatus of claim 1, wherein the oil injection outlets connected to the oil passage are located at a center of an axle hole of a gear after the gear drops.

5. The oil injection apparatus of claim 1, wherein the oil injection outlets connected to the oil passage are located at a middle portion of gear grooves after a gear drops.

6. The oil injection apparatus of claim 1, wherein the oil injection outlets have a rolling ball located therein.

7. The oil injection apparatus of claim 1, wherein the base seat has a plurality of layers which are alterable according to the sizes of objects for oil injection.

8. The oil injection apparatus of claim 1, wherein the oil injection outlets are evenly located on a surface of the base seat.

* * * * *